United States Patent
Fukaumi et al.

(10) Patent No.: US 12,312,494 B2
(45) Date of Patent: May 27, 2025

(54) RESIN COMPOSITION, METHOD FOR PRODUCING SAME, AND MULTI-LIQUID CURABLE RESIN COMPOSITION

(71) Applicant: KANEKA CORPORATION, Osaka (JP)

(72) Inventors: Hiroki Fukaumi, Takasago (JP); Youichi Matsuo, Takasago (JP); Shinji Kagitani, Takasago (JP)

(73) Assignee: KANEKA CORPORATION, Osaka (JP)

( * ) Notice: Subject to any disclaimer, the term of this patent is extended or adjusted under 35 U.S.C. 154(b) by 389 days.

(21) Appl. No.: 17/860,292

(22) Filed: Jul. 8, 2022

(65) Prior Publication Data
US 2022/0340777 A1     Oct. 27, 2022

Related U.S. Application Data

(63) Continuation of application No. PCT/JP2020/043223, filed on Nov. 19, 2020.

(30) Foreign Application Priority Data

Jan. 15, 2020 (JP) .................. 2020-004248

(51) Int. Cl.
| | | |
|---|---|---|
| C08G 77/08 | (2006.01) | |
| C08G 77/14 | (2006.01) | |
| C08G 77/32 | (2006.01) | |
| C09D 183/08 | (2006.01) | |

(52) U.S. Cl.
CPC ........... *C09D 183/08* (2013.01); *C08G 77/08* (2013.01); *C08G 77/14* (2013.01); *C08G 77/32* (2013.01)

(58) Field of Classification Search
USPC .......................................... 528/42
See application file for complete search history.

(56) References Cited

U.S. PATENT DOCUMENTS

2017/0283649 A1   10/2017   Fukaumi et al.

FOREIGN PATENT DOCUMENTS

| | | |
|---|---|---|
| JP | H1306477 A | 12/1989 |
| WO | 2016098596 A1 | 6/2016 |

OTHER PUBLICATIONS

International Search Report issued in corresponding International Application No. PCT/JP2020/043223, mailed Jan. 19, 2021, with translation (5 pages).
Written Opinion issued in corresponding International Application No. PCT/JP2020/043223, mailed Jan. 19, 2021 (3 pages).

*Primary Examiner* — Terressa Boykin
(74) *Attorney, Agent, or Firm* — Osha Bergman Watanabe & Burton LLP

(57) ABSTRACT

A resin composition containing (A) an organopolysiloxane having a glycidyloxy group, and (B) at least one selected from the group consisting of a triarylalkoxysilane, a diaryldialkoxysilane, a hydrolysate thereof and a partially hydrolyzed/condensed product thereof is provided. The resin composition may further contain (C) a β-dicarbonyl compound. The resin composition may further contain (D) an organic compound having one or more of an epoxy group, an oxetanyl group and a vinyl ether group. The resin composition may be mixed with (E) an organoaluminum compound and/or organotitanium compound and be cured.

15 Claims, No Drawings

RESIN COMPOSITION, METHOD FOR PRODUCING SAME, AND MULTI-LIQUID CURABLE RESIN COMPOSITION

TECHNICAL FIELD

One or more embodiments of the present invention relate to a resin composition containing an organopolysiloxane, a method for producing the resin composition, and a multi-liquid curable resin composition containing the resin composition.

BACKGROUND

In recent years, studies have been conducted on imparting scratch resistance, water resistance and chemical resistance to a base material such as an automobile interior base material by applying a curable composition containing an organopolysiloxane as a main component to a surface of the base material and curing the composition to form a hard coat layer.

The organopolysiloxane has been heretofore produced by subjecting an alkoxysilane having an organic group to hydrolysis and dehydration condensation in the presence of an acid catalyst or a base catalyst. However, when the alkoxysilane has an epoxy group as a thermosetting functional group, the epoxy group is deactivated by an acid catalyst or a base catalyst, or gelled during hydrolysis and dehydration condensation.

To solve the above, use of a neutral salt instead of an acid catalyst or a base catalyst as a condensation catalyst has been reported. Patent Literature 1 discloses a curable composition containing an organopolysiloxane obtained by subjecting an alkoxysilane compound, which has an epoxy group, to hydrolysis and dehydration condensation in the presence of a neutral salt catalyst, and a curing agent (e.g. an amine curing agent) which cures the epoxy group. Patent Literature 1 indicates that the organopolysiloxane has an epoxycyclohexyl group or a glycidyloxy group.

PATENT LITERATURE

PTL 1: WO 2016/098596 A1

Studies conducted by the present inventors have revealed that an organopolysiloxane having a glycidyloxy group as disclosed in Patent Literature 1 has a long pot life (time until gelation after mixing with a curing agent) suitable for practical use, but the cured product formed does not have sufficient scratch resistance, and there is a need for improvement.

In view of the above-described circumstances, one or more embodiments of the present invention provide a resin composition containing an epoxy group-containing organopolysiloxane, in which the resin composition exhibits a sufficient pot life after being mixed with a curing agent, and can form a cured product having excellent scratch resistance. One or more embodiments of the present invention provide a method for producing the resin composition. One or more embodiments of the present invention provide a multi-liquid curable resin composition containing the resin composition and a curing agent.

The present inventors have extensively conducted studies and resultantly found that the above embodiments can be achieved by blending a triarylalkoxysilane, a diaryldialkoxysilane, a hydrolysate thereof, or a partially hydrolyzed/condensed product thereof with an organopolysiloxane having a glycidyloxy group.

SUMMARY

One or more embodiments of the present invention relate to a resin composition containing (A) an organopolysiloxane having a glycidyloxy group, and (B) at least one selected from the group consisting of a triarylalkoxysilane, a diaryldialkoxysilane, a hydrolysate thereof and a partially hydrolyzed/condensed product thereof.

Preferably, the content of the at least one selected from the group consisting of a triarylalkoxysilane, a diaryldialkoxysilane, a hydrolysate thereof and a partially hydrolyzed/condensed product thereof (B) is 2 parts by weight or more and 20 parts by weight or less based on 100 parts by weight of a total of an epoxy group-containing component containing the organopolysiloxane (A).

Preferably, the triarylalkoxysilane is a triphenylalkoxysilane and the diaryldialkoxysilane is a diphenyldialkoxysilane.

Preferably, the at least one selected from the group consisting of a triarylalkoxysilane, a diaryldialkoxysilane, a hydrolysate thereof and a partially hydrolyzed/condensed product thereof (B) is at least one selected from the group consisting of triphenylmethoxysilane, triphenylsilanol, diphenyldimethoxysilane and diphenyldisilanol.

Preferably, the resin composition further contains (C) a β-dicarbonyl compound (C), in which the content of the β-dicarbonyl compound (C) is 0.5 parts by weight or more and 50 parts by weight or less based on 100 parts by weight of the organopolysiloxane (A).

Preferably, the resin composition further contains (D) an organic compound having one or more of an epoxy group, an oxetanyl group and a vinyl ether group, in which the content of the organic compound (D) is 1 part by weight or more and 200 parts by weight or less based on 100 parts by weight of the organopolysiloxane (A).

Preferably, the organic compound (D) has a molecular weight of 200 or more and 2,000 or less.

Preferably, the organopolysiloxane (A) further has an epoxy cyclohexyl group.

Preferably, the organopolysiloxane (A) satisfies a requirement that $[T3/(Q1+Q2+Q3+Q4+T1+T2+T3+D1+D2+M1)] \times 100$ be 75% or more and 100% or less (where among constituent units forming the organopolysiloxane (A), constituent units derived from a tetraalkoxysilane, which form one, two, three and four siloxane bonds, are defined as $Q1$, $Q2$, $Q3$ and $Q4$, respectively; constituent units derived from a monoorganotralkoxysilane, which form one, two and three siloxane bonds, are defined as $T1$, $T2$ and $T3$, respectively; constituent units derived from a diorganodialkoxysilane, which form one and two siloxane bonds, are defined as $D1$ and $D2$, respectively; and a constituent unit derived from a triorganomonoalkoxysilane, which forms one siloxane bond, is defined as $M1$).

Preferably, the resin composition further contains a neutral salt, in which the content of the neutral salt is 0.001 parts by weight or more and 1 part by weight or less based on 100 parts by weight of the organopolysiloxane (A).

One or more embodiments of the present invention also relate to a method for producing a resin composition, the method including the steps of: subjecting an alkoxysilane component containing an alkoxysilane compound having a glycidyloxy group-containing organic group to a hydrolysis and dehydration condensation reaction in presence of a neutral salt and water to obtain the organopolysiloxane (A) having a glycidyloxy group; and mixing the organopolysiloxane (A) with at least one selected from the group consisting of a triarylalkoxysilane, a diaryldialkoxysilane, a hydrolysate thereof and a partially hydrolyzed/condensed product thereof (B), in which the content of the at least one selected from the group consisting of a triarylalkoxysilane, a diaryldialkoxysilane, a hydrolysate thereof and a partially hydrolyzed/condensed product thereof (B) is 2 parts by weight or more and 20 parts by weight or less based on 100 parts by weight of a total of the epoxy group-containing component containing the organopolysiloxane (A), and the content of the neutral salt is 0.001 parts by weight or more and 1 part by weight or less based on 100 parts by weight of the organopolysiloxane (A).

Preferably, the method further includes a step of mixing the organopolysiloxane (A) with a β-dicarbonyl compound (C), in which the content of the β-dicarbonyl compound (C) is 0.5 parts by weight or more and 50 parts by weight or less based on 100 parts by weight of the organopolysiloxane (A).

Preferably, the method further includes a step of mixing the organopolysiloxane (A) with an organic compound (D) having one or more of an epoxy group, an oxetanyl group and a vinyl ether group and having a molecular weight of 200 or more and 2,000 or less, in which the content of the organic compound (D) is 1 part by weight or more and 200 parts by weight or less based on 100 parts by weight of the organopolysiloxane (A).

One or more embodiments of the present invention also relate to a multi-liquid curable resin composition including a first liquid and a second liquid, in which the first liquid is the resin composition, the second liquid contains (E) an organoaluminum compound and/or organotitanium compound, and the amount of the organoaluminum compound and/or organotitanium compound (E) is 0.5 parts by weight or more and 10 parts by weight or less based on 100 parts by weight of the organopolysiloxane (A).

One or more embodiments of the present invention also relate to a cured product obtained by mixing the resin composition with (E) an organoaluminum compound and/or organotitanium compound, and curing the mixture, in which the amount of the organoaluminum compound and/or organotitanium compound (E) is 0.5 parts by weight or more and 10 parts by weight or less based on 100 parts by weight of the organopolysiloxane (A).

One or more embodiments of the present invention also relate to a method for producing a laminate including a base material and a cured coating film, the method including the steps of: mixing the resin composition with (E) an organoaluminum compound and/or organotitanium compound to obtain a mixture; and applying the mixture to a base material, and curing the mixture by heating to form a cured coating film, in which the amount of the organoaluminum compound and/or organotitanium compound (E) is 0.5 parts by weight or more and 10 parts by weight or less based on 100 parts by weight of the organopolysiloxane (A).

According to one or more embodiments of the present invention, it is possible to provide a resin composition containing an epoxy group-containing organopolysiloxane, in which the resin composition exhibits a sufficient pot life after being mixed with a curing agent, and can form a cured product having excellent scratch resistance. It is also possible to provide a method for producing the resin composition. It is also possible to provide a multi-liquid curable resin composition containing the resin composition and a curing agent. The cured product obtained by a preferred aspect of one or more embodiments of the present invention can have good hot water resistance, chemical resistance and adhesion to a base material. The cured product obtained according to the embodiments of the present invention can also have good crack resistance.

DETAILED DESCRIPTION

Hereinafter, embodiments of the present invention will be described in detail, but the embodiments of the present invention are not limited to these embodiments.

A resin composition according to one or more embodiments contains (A) at least an organopolysiloxane having a glycidyloxy group, and (B) at least one selected from the group consisting of a triarylalkoxysilane, a diaryldialkoxysilane, a hydrolysate thereof and a partially hydrolyzed/condensed product thereof.

(Organopolysiloxane (A) Having Glycidyloxy Group)

The organopolysiloxane (A) having a glycidyloxy group is an organopolysiloxane formed by subjecting an alkoxysilane component containing an alkoxysilane compound having a glycidyloxy group-containing organic group to a hydrolysis and dehydration condensation reaction in the presence of water. The organopolysiloxane (A) in the present disclosure does not refer to a composite resin obtained by combining an organopolysiloxane and acrylic silicon as disclosed in, for example, WO 2017/169459 A1, but refers to an organopolysiloxane which is not bonded to an organic resin.

The alkoxysilane component that is a precursor of the component (A) includes one or two or more silane compounds having an alkoxy group as a substituent on a silicon atom (hereinafter, also referred to as an alkoxysilane compound). Specific examples of the alkoxysilane compound include tetraalkoxysilane, monoorganotrialkoxysilane, diorganodialkoxysilane and triorganomonoalkoxysilane. Preferably, the alkoxysilane component contains at least a monoorganotrialkoxysilane. The alkoxysilane component may include only a monoorganotrialkoxysilane, or only a monoorganotrialkoxysilane and a diorganodialkoxysilane. The monoorganotrialkoxysilane refers to a silane compound having one organic group and three alkoxy groups as substituents on a silicon atom, and the diorganodialkoxysilane refers to a silane compound having two organic groups and two alkoxy groups as substituents on a silicon atom.

According to a preferred embodiment, it is preferable that the alkoxysilane component contains a monoorganotrialkoxysilane at 70 mol % or more and 100 mol % or less and a diorganodialkoxysilane at 30 mol % or less and 0 mol % or more. It is to be noted that the total amount of the monoorganotrialkoxysilane and the diorganodialkoxysilane is 100 mol %. The ratio of the monoorganotrialkoxysilane may be 80 mol % or more, 90 mol % or more, 95 mol % or more, 99 mol % or more, or 100 mod %.

The alkoxysilane component may contain a triorganomonoalkoxysilane and/or a tetraalkoxysilane in addition to the monoorganotrialkoxysilane or in addition to the monoorganotrialkoxysilane and the diorganodialkoxysilane. When the triorganomonoalkoxysilane and/or tetraalkoxysilane are used, the use amount thereof may be determined within the bounds of not inhibiting the effect of the invention, and for example, the ratio of the triorganomonoalkoxysilane and/or tetraalkoxysilane to the whole alkoxysilane component may be 10 mol % or less, 5 mol % or less, or 1 mol % or less.

The organic group present as a substituent on a silicon atom in the alkoxysilane compound is an organic group other than an alkoxy group. Specific examples include, but are not particularly limited to, alkyl groups having 1 or more and 8 or less carbon atoms, alkenyl groups having 2 or more and 8 or less carbon atoms, and aryl groups having 6 or more and 12 or less carbon atoms. The alkyl group, the alkenyl group and the aryl group may be an unsubstituted group, or may have a substituent. The number of carbon atoms in the alkyl group (excluding the number of carbon atoms in a substituent when the alkyl group has the substituent) may be 1 or more and 6 or less, 1 or more and 4 or less, 1 or more and 3 or less, or 1 or more and 2 or less. The number of carbon atoms in the alkenyl group may be 2 or more and 6 or less, 2 or more and 4 or less, or 2 or more and 3 or less. Only one of the organic groups, or two or more thereof may be present.

Examples of the alkoxy group present as a substituent on a silicon atom in the alkoxysilane compound include alkoxy groups having 1 or more and 3 or less carbon atoms. Specific examples thereof include a methoxy group, an ethoxy group and a propoxy group, and a methoxy group and an ethoxy group are preferable, with a methoxy group being more preferable. Only one of the alkoxy groups, or two or more thereof may be present.

The alkoxysilane component contains at least an alkoxysilane compound having a glycidyloxy group-containing organic group. By using the compound, a glycidyloxy group can be introduced into the organopolysiloxane (A). By the glycidyloxy group, the crosslinking density of a cured product obtained by curing the curable resin composition can be enhanced to improve scratch resistance. The alkoxysilane compound having a glycidyloxy group-containing organic group may be any of a monoorganotrialkoxysilane, a diorganodialkoxysilane and a triorganomonoalkoxysilane, with a monoorganotrialkoxysilane being preferable.

Examples of the alkoxysilane compound having a glycidyloxy group-containing organic group include trialkoxysilane compounds having a glycidyloxyalkyl group, and dialkoxysilane compounds having a glycidyloxyalkyl group and another organic group. Specific examples thereof include 1-glycidyloxymethyl trimethoxysilane, 1-glycidyloxymethylmethyl dimethoxysilane, 1-glycidyloxymethyl triethoxysilane, 1-glycidyloxymethyl diethoxysilane, 2-glycidyloxyethyl trimethoxysilane, 2-glycidyloxyethylmethyl dimethoxysilane, 2-glycidyloxyethyl triethoxysilane, 2-glycidyloxyethylmethyl diethoxysilane, 3-glycidyloxypropyl trimethoxysilane, 3-glycidyloxypropylmethyl dimethoxysilane, 3-glycidyloxypropyl triethoxysilane, 3-glycidyloxypropylmethyl diethoxysilane, 4-glycidyloxybutyl trimethoxysilane, 4-glycidyloxybutylmethyl dimethoxysilane, 4-glycidyloxybutyl triethoxysilane, 4-glycidyloxybutylmethyl diethoxysilane, 6-glycidyloxyhexyl trimethoxysilane, 6-glycidyloxyhexylmethyl dimethoxysilane, 6-glycidyloxyhexyl triethoxysilane, 6-glycidyloxyhexylmethyl diethoxysilane, 8-glycidyloxyoctyl trimethoxysilane, 8-glycidyloxyoctylmethyl dimethoxysilane, 8-glycidyloxyoctyl triethoxysilane and 8-glycidyloxyoctylmethyl diethoxysilane. Among them, a trialkoxysilane compound having a 3-glycidyloxypropyl group or a dialkoxysilane compound having a 3-glycidyloxypropyl group is preferable, and a trialkoxysilane compound having a 3-glycidyloxypropyl group is particularly preferable.

The alkoxysilane component may include only one or two or more alkoxysilane compounds having a glycidyloxy group-containing organic group, or may include one or two or more alkoxysilane compounds having a glycidyloxy group-containing organic group and one or two or more alkoxysilane compounds having no glycidyloxy group.

The ratio of the alkoxysilane compound having a glycidyloxy group-containing organic group to the total of the alkoxysilane component may be 50 mol % or more and 100 mol % or less. When the alkoxysilane compound having a glycidyloxy group-containing organic group is used at such a ratio, the density of glycidyloxy groups serving as crosslinking points increases, so that the crosslinking density of the resulting cured product can be enhanced to improve scratch resistance. The ratio may be 60 mol % or more, 70 mol % or more, or 100 mol %.

Alkoxysilane compounds having no glycidyloxy group are classified into alkoxysilane compounds having an epoxycyclohexyl group-containing organic group, other epoxy group-containing alkoxysilane compounds, and alkoxysilane compounds having no epoxy group. These are optional components, and may be omitted.

According to one or more embodiments, it is preferable that the alkoxysilane component further contains the alkoxysilane compound having an epoxycyclohexyl group-containing organic group, i.e. contains both an alkoxysilane compound having a glycidyloxy group-containing organic group and an alkoxysilane compound having an epoxycyclohexyl group-containing organic group. This enables introduction of both a glycidyloxy group and an epoxycyclohexyl group into the organopolysiloxane (A). Since an epoxycyclohexyl group is also present, the cured product has excellent scratch resistance, and the chemical resistance of the cured product can be improved. However, introduction of an epoxycyclohexyl group with no glycidyloxy group introduced cannot achieve excellent scratch resistance.

The alkoxysilane compound having an epoxycyclohexyl group-containing organic group may be any of a monoorganotrialkoxysilane, a diorganodialkoxysilane and a triorganomonoalkoxysilane, and is preferably a monoorganotrialkoxysilane.

Examples of the alkoxysilane compound having an epoxycyclohexyl group-containing organic group include trialkoxysilanes having an epoxycyclohexylalkyl group, and dialkoxysilanes having an epoxycyclohexylalkyl group and another organic group. Specific examples thereof include 1-(3,4-epoxycyclohexyl)methyltrimethoxysilane, 1-(3,4-epoxycyclohexyl)methylmethyldimethoxysilane, 1-(3,4-epoxycyclohexyl)methyltriethoxysilane, 1-(3,4-epoxycyclohexyl)methylmethyldiethoxysilane, 2-(3,4-epoxycyclohexyl)ethyltrimethoxysilane, 2-(3,4-epoxycyclohexyl)ethylmethyldimethoxysilane, 2-(3,4-epoxycyclohexyl)ethyltriethoxysilane, 2-(3,4-epoxycyclohexyl)ethylmethyldiethoxysilane, 3-(3,4-epoxycyclohexyl)propyltrimethoxysilane, 3-(3,4-epoxycyclohexyl)propylmethyldimethoxysilane, 3-(3,4-epoxycyclohexyl)propyltriethoxysilane, 3-(3,4-epoxycyclohexyl)propylmethyldiethoxysilane, 4-(3,4-epoxycyclohexyl)butyltrimethoxysilane, 4-(3,4-epoxycyclohexyl)butylmethyldimethoxysilane, 4-(3,4-epoxycyclohexyl)butyltriethoxysilane, 4-(3,4-epoxycyclohexyl)butylmethyldiethoxysilane, 6-(3,4-epoxycyclohexyl)hexyltrimethoxysilane, 6-(3,4-epoxycyclohexyl)hexylmethyldimethoxysilane, 6-(3,4-epoxycyclohexyl)hexyltriethoxysilane, 6-(3,4-epoxycyclohexyl)hexylmethyldiethoxysilane, 8-(3,4-epoxycyclohexyl)octyltrimethoxysilane, 8-(3,4-epoxycyclohexyl)octylmethyldimethoxysilane, 8-(3,4-epoxycyclohexyl)octyltriethoxysilane, and 8-(3,4-epoxycyclohexyl)octylmethyldiethoxysilane. Among them, a trialkoxysilane compound having a 2-(3,4-epoxycyclohexyl)ethyl group or a dialkoxysilane compound having a 2-(3,4-epoxycyclohexyl)ethyl group is preferable, and a trialkoxysilane compound having a 2-(3,4-epoxycyclohexyl)ethyl group is particularly preferable.

In one or more embodiments in which an alkoxysilane compound having an epoxycyclohexyl group-containing organic group is also used, the ratio of the alkoxysilane compound having an epoxycyclohexyl group-containing organic group to the total amount of the alkoxysilane component may be 1 mol % or more and 50 mol % or less. When the alkoxysilane compound having an epoxycyclohexyl group-containing organic group is used at such a ratio, the effect of improving chemical resistance by the compound can be achieved, and a long pot life suitable for practical use can be maintained. The ratio may be 1 mol % or more and 40 mol % or less, 1 mol % or more and 30 mol % or less, or 3 mol % or more and 25 mol % or less.

Examples of the other epoxy group-containing alkoxysilane compound include epoxy trimethoxysilane, epoxymethyl dimethoxysilane, epoxy triethoxysilane, epoxymethyl diethoxysilane, 1-epoxymethyl trimethoxysilane, 1-epoxymethylmethyl dimethoxysilane, 1-epoxymethyl triethoxysilane, 1-epoxymethylmethyl diethoxysilane, 2-epoxyethyl trimethoxysilane, 2-epoxyethylmethyl dimethoxysilane, 2-epoxyethyl triethoxysilane, 2-epoxyethylmethyl diethoxysilane, 3-epoxypropyl trimethoxysilane, 3-epoxypropylmethyl dimethoxysilane, 3-epoxypropyl triethoxysilane, 3-epoxypropylmethyl diethoxysilane, 4-epoxybutyl trimethoxysilane, 4-epoxybutylmethyl dimethoxysilane, 4-epoxybutyl triethoxysilane, 4-epoxybutylmethyl diethoxysilane, 6-epoxyhexyl trimethoxysilane, 6-epoxyhexylmethyl dimethoxysilane, 6-epoxyhexyl triethoxysilane, 6-epoxyhexylmethyl diethoxysilane, 8-epoxyoctyl trimethoxysilane, 8-epoxyoctylmethyl dimethoxysilane, 8-epoxyoctyl triethoxysilane and 8-epoxyoctylmethyl diethoxysilane.

The alkoxysilane compound having no epoxy group is not particularly limited. Examples of the alkoxysilane compound having no epoxy group when the organic group present as a substituent on a silicon atom in the alkoxysilane compound is an unsubstituted alkyl group include methyl trimethoxysilane, dimethyl dimethoxysilane, methyl triethoxysilane, dimethyl diethoxysilane, ethyl trimethoxysilane, ethylmethyl dimethoxysilane, ethyl triethoxysilane, ethylmethyl diethoxysilane, propyl trimethoxysilane, propylmethyl dimethoxysilane, propyl triethoxysilane, propylmethyl diethoxysilane, butyl trimethoxysilane, butylmethyl dimethoxysilane, butyl triethoxysilane, butyl triethoxysilane, butylmethyl diethoxysilane, hexyl trimethoxysilane, hexylmethyl dimethoxysilane, hexylmethyl dimethoxysilane, hexyl triethoxysilane, hexylmethyl diethoxysilane, octyl trimethoxysilane, octylmethyl dimethoxysilane, octyl triethoxysilane, and octylmethyl diethoxysilane.

When the organic group present as a substituent on a silicon atom in the alkoxysilane compound is an organic group having a substituent, the substituent is not particularly limited, and is preferably a thiol group, an isocyanate group, a (meth)acryloyl group, a phenyl group, a cyclohexyl group or a chloro group from the viewpoint of availability.

Examples of the alkoxysilane compound having no epoxy group when the organic group is an alkyl group having a thiol group include 1-mercaptomethyl trimethoxysilane, 1-mercaptomethylmethyl dimethoxysilane, I-mercaptomethyl triethoxysilane, 1-mercaptomethylmethyl diethoxysilane, 2-mercaptoethyl trimethoxysilane, 2-mercaptoethylmethyl dimethoxysilane, 2-mercaptoethyl triethoxysilane, 2-mercaptoethylmethyl diethoxysilane, 3-mercaptopropyl trimethoxysilane, 3-mercaptopropylmethyl dimethoxysilane, 3-mercaptopropyl triethoxysilane, 3-mercaptopropylmethyl diethoxysilane, 4-mercaptobutyl trimethoxysilane, 4-mercaptobutylmethyl dimethoxysilane, 4-mercaptobutyl triethoxysilane, 4-mercaptobutylmethyl diethoxysilane, 6-mercaptohexyl trimethoxysilane, 6-mercaptohexylmethyl dimethoxysilane, 6-mercaptohexyl triethoxysilane, 6-mercaptohexylmethyl diethoxysilane, 8-mercaptooctyl trimethoxysilane, 8-mercaptooctylmethyl dimethoxysilane, 8-mercaptooctyl triethoxysilane and 8-mercaptooctylmethyl diethoxysilane.

Examples of the alkoxysilane compound having no epoxy group when the organic group is an alkyl group having an isocyanate group include 1-isocyanatemethyl trimethoxysilane, 1-isocyanatemethylmethyl dimethoxysilane, 1-isocyanatemethyl triethoxysilane, 1-isocyanatemethylmethyl diethoxysilane, 2-isocyanateethyl trimethoxysilane, 2-isocyanateethylmethyl dimethoxysilane, 2-isocyanateethyl triethoxysilane, 2-isocyanateethylmethyl diethoxysilane, 3-isocyanatepropyl trimethoxysilane, 3-isocyanatepropylmethyl dimethoxysilane, 3-isocyanatepropyl triethoxysilane, 3-isocyanatepropylmethyl diethoxysilane, 4-isocyanatebutyl trimethoxysilane, 4-isocyanatebutylmethyl dimethoxysilane, 4-isocyanatebutyl triethoxysilane, 4-isocyanatebutylmethyl diethoxysilane, 6-isocyanatehexyl trimethoxysilane, 6-isocyanatehexylmethyl dimethoxysilane, 6-isocyanatehexyl tiethoxysilane, 6-isocyanatehexylmethyl diethoxysilane, 8-isocyanateoctyl trimethoxysilane, 8-isocyanateoctylmethyl dimethoxysilane, 8-isocyanateoctyl triethoxysilane and 8-isocyanateoctylmethyl diethoxysilane.

Examples of the alkoxysilane compound having no epoxy group when the organic group is an alkyl group having a (meth)acryloyl group include 1-(meth)acryloyloxymethyl trimethoxysilane, 1-(meth)acryloyloxymethylmethyl dimethoxysilane, 1-(meth)acryloyloxymethyl triethoxysilane, 1-(meth)acryloyloxymethyl diethoxysilane, 2-(meth)acryloyloxyethyl trimethoxysilane, 2-(meth)acryloyloxyethylmethyl dimethoxysilane, 2-(meth)acryloyloxyethyl triethoxysilane, 2-(meth)acryloyloxyethylmethyl diethoxysilane, 3-(meth)acryloyloxypropyl trimethoxysilane, 3-(meth)acryloyloxypropylmethyl dimethoxysilane, 3-(meth)acryloyloxypropyl tiethoxysilane, 3-(meth)acryloyloxypropylmethyl diethoxysilane, 4-(meth)acryloyloxybutyl trimethoxysilane, 4-(meth)acryloyloxybutylmethyl dimethoxysilane, 4-(meth)acryloyloxybutyl tiethoxysilane, 4-(meth)acryloyloxybutylmethyl diethoxysilane, 6-(meth)acryloyloxyhexyl trimethoxysilane, 6-(meth)acryloyloxyhexylmethyl dimethoxysilane, 6-(meth)acryloyloxyhexyl triethoxysilane, 6-(meth)acryloyloxyhexylmethyl diethoxysilane, 8-(meth)acryloyloxyoctyl trimethoxysilane, 8-(meth)acryloyloxyoctylmethyl dimethoxysilane, 8-(meth)acryloyloxyoctyl triethoxysilane and 8-(meth)acryloyloxyoctylmethyl diethoxysilane.

Examples of the alkoxysilane compound having no epoxy group when the organic group is an alkyl group having a phenyl group include benzyl trimethoxysilane, benzyl tiethoxysilane, 2-phenylethyl trimethoxysilane, 2-phenylethyl tiethoxysilane, 3-phenylpropyl trimethoxysilane, 3-phenylpropyl tiethoxysilane, 4-phenylbutyl trimethoxysilane, 4-phenylbutyl triethoxysilane, 5-phenylpentyl trimethoxysilane, 5-phenylpentyl tiethoxysilane, 6-phenylhexyl trimethoxysilane, and 6-phenylhexyl tiethoxysilane.

Examples of the alkoxysilane compound having no epoxy group when the organic group is an alkyl group having a cyclohexyl group include cyclohexyl trimethoxysilane, cyclohexyl triethoxysilane, 2-cyclohexylethyl trimethoxysilane, 2-cyclohexylethyl tiethoxysilane, 3-cyclohexylpropyl trimethoxysilane, 3-cyclohexylpropyl tiethoxysilane, 4-cyclohexylbutyl trimethoxysilane, 4-cyclohexylbutyl tiethoxysilane, 5-cyclohexylpentyl trimethoxysilane, 5-cyclohexylpentyl triethoxysilane, 6-cyclohexylhexyl trimethoxysilane, and 6-cyclohexylhexyl tiethoxysilane.

Examples of the alkoxysilane compound having no epoxy group when the organic group is an alkyl group having a chloro group include chloromethyl trimethoxysilane, chloromethyl triethoxysilane, 2-chloroethyl trimethoxysilane, 2-chloroethyl triethoxysilane, 3-chloropropyl trimethoxysilane, 3-chloropropyl triethoxysilane, 4-chlorobutyl trimethoxysilane, 4-chlorobutyl triethoxysilane, 5-chloropentyl trimethoxysilane, 5-chloropentyl triethoxysilane, 6-chlorohexyl trimethoxysilane, and 6-chlorohexyl triethoxysilane.

Examples of the alkoxysilane compound having no epoxy group when the organic group is an alkenyl group include vinyl trimethoxysilane, vinylmethyl dimethoxysilane, vinyl triethoxysilane, vinylmethyl diethoxysilane, allyl trimethoxysilane, allylmethyl dimethoxysilane, allyl triethoxysilane, and allylmethyl diethoxysilane.

Examples of the alkoxysilane compound having no epoxy group when the organic group is an aryl group include phenyl trimethoxysilane, phenylmethyl dimethoxysilane, phenyl triethoxysilane, phenylmethyl diethoxysilane, diphenyl dimethoxysilane, diphenyl diethoxysilane, p-styryl trimethoxysilane, and p-styryl tiethoxysilane.

The organopolysiloxane (A) having a glycidyloxy group may have an alkoxysilyl group and/or a silanol group in addition to a glycidyloxy group. The alkoxysilyl group and/or silanol group that can be present in the organopolysiloxane (A) is such that some of alkoxy groups contained in the alkoxysilane component remain unreacted, or the alkoxy groups remain as silanol groups without procession of a dehydration condensation reaction after undergoing a hydrolysis reaction.

The organopolysiloxane (A) may be one in which in all the constituent units (Q1, Q2, Q3, Q4, T1, T2, T3, D1, D2 and M1) forming the organopolysiloxane (A), the ratio of the constituent unit T3 derived from a monoorganotrialkoxysilane and forming three siloxane bonds: $[T3/(Q1+Q2+Q3+Q4+T1+T2+T3+D1+D2+M1)] \times 100$ is high. The ratio of T3 being a high value means that there are many sites having a silsesquioxane structure in the organopolysiloxane (A). The silsesquioxane structure is a structure which has both a dense crosslinked structure and flexibility, and contributes to development of scratch resistance, hot water resistance and chemical resistance of a cured product. On the other hand, when the ratio of T3 is 0%, there is no silsesquioxane structure, and desired physical properties are hardly developed.

Here, among constituent units forming the organopolysiloxane (A), constituent units derived from tetraalkoxysilane, which form one, two, three and four siloxane bonds, are defined as Q1, Q2, Q3 and Q4, respectively, constituent units derived from a monoorganotrialkoxysilane, which form one, two and three siloxane bonds, are defined as T1, T2 and T3, respectively, constituent units derived from a diorganodialkoxysilane, which form one and two siloxane bonds, are defined as D1 and D2, respectively, and a constituent unit derived from a triorganomonoalkoxysilane, which forms one siloxane bond, is defined as M1.

On the basis of peak areas of peaks derived from Q1, Q2, Q3, Q4, T1, T2, T3, D1, D2 and M1, which are measured by $^{29}$Si-NMR, the ratio of T3 is calculated as a ratio (%) of an area of a peak derived from T3 to the total peak area.

In one or more embodiments, it is preferable that an organopolysiloxane having a high ratio of T3 is used as the component (A). This enables suppression of generation of cracks due to shrinkage by curing after curing of a multi-liquid curable resin composition described later. On the other hand, if an organopolysiloxane having a high ratio of T3 is used, there is a tendency that cationic polymerization of an epoxy group does not sufficiently proceed, and thus the scratch resistance of the resulting cured product is deteriorated. However, in one or more embodiments, a component (B) described later is used, so that the cured product can exhibit good scratch resistance even if an organopolysiloxane having a high ratio of T3 is used.

Specifically, the organopolysiloxane having a high ratio of T3 is one in which $T3/(Q1+Q2+Q3+Q4+T1+T2+T3+D1+D2+M1)] \times 100$ may be 75% or more and 100% or less, 80% or more and 99% or less, or 85% or more and 98% or less. When $T3/(Q1+Q2+Q3+Q4+T1+T2+T3+D1+D2+M1)] \times 100$ is 75% or more, generation of cracks due to shrinkage by curing can be effectively suppressed.

The ratio of T3 can be controlled by adjusting the amount of water and the type and amount of a catalyst used in the hydrolysis and dehydration condensation reaction for forming the organopolysiloxane, the reaction temperature, the removal amount of alcohol generated in the hydrolysis reaction, and the like.

The weight average molecular weight (MW) of the organopolysiloxane (A) is not particularly limited, and is preferably 500 or more and 300,000 or less, more preferably 1,000 or more and 200,000 or less, and still more preferably 3,000 or more and 100,000 or less from the viewpoints of adhesion of the cured product to the base material, scratch resistance, water resistance, the appearance of the cured product, storage stability and the like. The weight average molecular weight of the organopolysiloxane can be determined by the method described in the section of examples.

(Method for Producing Organopolysiloxane (A))

Next, a method for producing the organopolysiloxane (A) having a glycidyloxy group will be described. The organopolysiloxane (A) can be obtained by subjecting an alkoxysilane component containing an alkoxysilane compound having a glycidyloxy group-containing organic group to a hydrolysis and dehydration condensation reaction in the presence of water. In the hydrolysis and dehydration condensation reaction, some of alkoxy groups contained in the alkoxysilane component may remain unreacted, or the alkoxy groups may remain as silanol groups without procession of a dehydration condensation reaction after undergoing a hydrolysis reaction. Here, the produced organopolysiloxane may have an alkoxysilyl group and/or a silanol group in addition to a glycidyloxy group.

The hydrolysis and dehydration condensation reaction of the alkoxysilane component can be carried out in the presence of abase catalyst, an acid catalyst or a neutral salt as a condensation catalyst, and water, and in one or more embodiments, it is preferable to carry out the hydrolysis and dehydration condensation reaction in the presence of a neutral salt as a condensation catalyst and water. By carrying out the hydrolysis/dehydration condensation reaction in the presence of a neutral salt catalyst, the component (A) can be suitably obtained while deactivation of the glycidyloxy group is suppressed, and by using the obtained component (A) in combination with the components described later, a longer pot life can be exhibited and scratch resistance after curing can be further improved. When the hydrolysis and dehydration condensation reaction is carried out in the presence of a neutral salt, it is preferable to carry out the reaction without any of a base catalyst and an acid catalyst.

In the present disclosure, the neutral salt refers to a normal salt including a strong acid and a strong base. Specifically, the neutral salt is a salt including a combination of any cation selected from the group consisting of group I element ions, group II element ions, a tetraalkylammonium ion and a guanidinium ion and any anion selected from the group consisting of group XVII element ions except for the fluoride ion, a sulfate ion, a nitrate ion and a perchlorate ion. Specific Examples of the Neutral Salt Include the Following Compounds:

- lithium chloride, sodium chloride, potassium chloride, rubidium chloride, cesium chloride, francium chloride, beryllium chloride, magnesium chloride, calcium chloride, strontium chloride, barium chloride, radium chloride, tetramethylammonium chloride, tetraethylammonium chloride, tetrapropylammonium chloride, tetrabutylammonium chloride, tetrapentylammonium chloride, tetrahexylammonium chloride and guanidinium chloride;
- lithium bromide, sodium bromide, potassium bromide, rubidium bromide, cesium bromide, francium bromide, beryllium bromide, magnesium bromide, calcium bromide, strontium bromide, barium bromide, radium bromide, tetramethylammonium bromide, tetraethylammonium bromide, tetrapropylammonium bromide, tetrabutylammonium bromide, tetrapentylammonium bromide, tetrahexylammonium bromide and guanidinium bromide;
- lithium iodide, sodium iodide, potassium iodide, rubidium iodide, cesium iodide, francium iodide, beryllium iodide, magnesium iodide, calcium iodide, strontium iodide, barium iodide, radium iodide, tetramethylammonium iodide, tetraethylammonium iodide, tetrapropylammonium iodide, tetrabutylammonium iodide, tetrapentylammonium iodide, tetrahexylammonium iodide and guanidinium iodide;
- lithium sulfate, sodium sulfate, potassium sulfate, rubidium sulfate, cesium sulfate, francium sulfate, beryllium sulfate, magnesium sulfate, calcium sulfate, strontium sulfate, barium sulfate, radium sulfate, tetramethylammonium sulfate, tetraethylammonium sulfate, tetrapropylammonium sulfate, tetrabutylammonium sulfate, tetrapentylammonium sulfate, tetrahexylammonium sulfate and guanidinium sulfate;
- lithium nitrate, sodium nitrate, potassium nitrate, rubidium nitrate, cesium nitrate, francium nitrate, beryllium nitrate, magnesium nitrate, calcium nitrate, strontium nitrate, barium nitrate, radium nitrate, tetramethylammonium nitrate, tetraethylammonium nitrate, tetrapropylammonium nitrate, tetrabutylammonium nitrate, tetrapentylammonium nitrate, tetrahexylammonium nitrate and guanidinium nitrate; and
- lithium perchlorate, sodium perchlorate, potassium perchlorate, rubidium perchlorate, cesium perchlorate, francium perchlorate, beryllium perchlorate, magnesium perchlorate, calcium perchlorate, strontium perchlorate, barium perchlorate, radium perchlorate, tetramethylammonium perchlorate, tetraethylammonium perchlorate, tetrapropylammonium perchlorate, tetrabutylammonium perchlorate, tetrapentylammonium perchlorate, tetrahexylammonium perchlorate and guanidinium perchlorate. As the neutral salt, a single compound may be used, or two or more compounds may be used in combination.

The anion that forms the neutral salt may be a group XVII element ion because it has high nucleophilicity. The cation is preferably one that is not so bulky that the nucleophilic action is inhibited, and specifically, group I element ions or group II element ions are preferable. Further, in view of availability and safety during handling, the neutral salt is particularly preferably lithium chloride, sodium chloride, potassium chloride, rubidium chloride, cesium chloride, magnesium chloride, calcium chloride, strontium chloride, lithium bromide, sodium bromide, potassium bromide, rubidium bromide, cesium bromide, magnesium bromide, calcium bromide, strontium bromide, lithium iodide, sodium iodide, potassium iodide, rubidium iodide, cesium iodide, magnesium iodide, calcium iodide or strontium iodide.

The amount of the neutral salt added in the hydrolysis and dehydration condensation reaction can be appropriately determined according to a desired degree of procession of the hydrolysis and dehydration condensation reaction, and is typically 1 ppm or more and 100000 ppm or less, preferably 10 ppm or more and 10000 ppm or less, more preferably 20 ppm or more and 5000 ppm or less, still more preferably 50 ppm or more and 1000 ppm or less, based on the total weight of the alkoxysilane component.

In the hydrolysis and dehydration condensation reaction, the reaction is caused to proceed by adding water. Here, by controlling the amount of water used, the degree of procession of the hydrolysis and dehydration condensation reaction, and hence the ratio of T3 in the organopolysiloxane and the molecular weight of the organopolysiloxane can be controlled. From this viewpoint, the amount of water used may be 20 mol % or more and 100 mol % or less based on the total number of moles of alkoxy groups directly bonded to silicon atoms contained in the alkoxysilane component. When the amount is 20 mol % or more, the hydrolysis and dehydration condensation reaction can sufficiently proceed, and when the amount is 100 mol % or less, the adhesion of the resulting cured product to the base material and the water resistance can be improved. The amount of water used may be 20 mol % or more and 90 mol % or less, 25 mol % or more and 80 mol % or less, 30 mol % or more and 80 mol % or less, or 30 mol % or more and 60 mol % or less.

In the hydrolysis and dehydration condensation reaction, an organic solvent other than water may be used in addition to water. The organic solvent may be an organic solvent having a high solubility in water because the organic solvent is used in combination with water. An organic solvent having 4 or more carbon atoms is preferable for securing solubility of the alkoxysilane component. From the above viewpoint, examples of the preferred organic solvent include, but are not limited to, propylene glycol methyl ether acetate, diethylene glycol monomethyl ether, triethylene glycol monomethyl ether, polyethylene glycol monomethyl ether, ethylene glycol monoethyl ether, ethylene glycol monoisopropyl ether, diethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, propylene glycol monomethyl ether, propylene glycol dimethyl ether, dipropylene glycol monomethyl ether, tripropylene glycol monomethyl ether, propylene glycol monoethyl ether, propylene glycol monopropyl ether, ethylene glycol dimethyl ether, diethylene glycol dimethyl ether, triethylene glycol dimethyl ether, diethylene glycol methyl ethyl ether, diethylene glycol diethyl ether, ethylene glycol diethyl ether, tetrahydrofuran, acetone, methyl ethyl ketone, methyl acetate, ethyl acetate, methanol, ethanol, 1-propanol and 2-propanol.

When the hydrolysis and dehydration condensation reaction is carried out, the reaction temperature can be appropriately set by those skilled in the art, and for example, it is preferable to heat the reaction liquid to a range of 50° C. or higher and 110° C. or lower. When the hydrolysis and dehydration condensation reaction is carried out at a temperature of 110° C. or lower, the organopolysiloxane (A) is easily produced. When the hydrolysis and dehydration condensation reaction is carried out, the reaction time can be appropriately set by those skilled in the art, and may be, for example, about 10 minutes or more and 12 hours or less.

According to a preferred embodiment, it is preferable to carry out a step of removing alcohol generated in the hydrolysis reaction from the reaction liquid after the hydrolysis and dehydration condensation reaction. Removal of alcohol enables further procession of the hydrolysis reaction of alkoxysilyl groups in which alcohol is generated as a by-product. The step of removing alcohol can be carried out by subjecting the reaction liquid after the hydrolysis and dehydration condensation reaction to distillation under reduced pressure to distill off the alcohol. Conditions for distillation under reduced pressure can be appropriately set by those skilled in the at, and the temperature at this time may be 50° C. or higher and 110° C. or lower for the same reason as described above. In this step, it is preferable to remove preferably 80 mol % or more, more preferably 90 mol % or more of the alcohol generated in the hydrolysis reaction.

After alcohol is removed as described above, the reaction system is cooled to, for example, 30° C. or lower to obtain the organopolysiloxane (A) having a glycidyloxy group.

When the neutral salt is used as a condensation catalyst in production of the organopolysiloxane (A), the resulting organopolysiloxane (A) can contain the neutral salt. As a result, the resin composition of one or more embodiments can also contain the neutral salt. In this case, the content of the neutral salt is typically 0.001 parts by weight or more and 1 part by weight or less, preferably 0.005 parts by weight or more and 0.1 parts by weight or less, more preferably 0.01 parts by weight or more and 0.05 parts by weight or less, based on 100 parts by weight of the organopolysiloxane (A).

When the organopolysiloxane (A) is produced using a neutral salt as a condensation catalyst, the resin composition of one or more embodiments is typically free of a base catalyst and an acid catalyst. Thus, the resin composition of one or more embodiments may contain neither an acidic compound having a molecular weight of 1,000 or less nor a basic compound having a molecular weight of 1,000 or less. Here, the acidic compound or basic compound having a molecular weight of 1,000 or less includes an acid catalyst or a base catalyst which is generally used in a hydrolysis and dehydration condensation reaction of an alkoxysilane component.

(Component (B))

The component (B) is at least one selected from the group consisting of a triarylalkoxysilane, a diaryldialkoxysilane, a hydrolysate thereof and a partially hydrolyzed/condensed product thereof. Here, the partially hydrolyzed/condensed product means that some alkoxy groups remain as such or as hydroxyl groups, where hydrolysis/condensation products in which all alkoxy groups of a triarylalkoxysilane or a diaryldialkoxysilane are hydrolyzed/condensed to form a siloxane bond are excluded.

The raw material for the partially hydrolyzed/condensed product is a triarylalkoxysilane and/or a diariyldialkoxysilane. An alkoxysilane other than those mentioned above may be used in combination as a raw material, and the use amount thereof may be small. Specifically, the proportion of the total amount of the triarylalkoxysilane and the diaryldialkoxysilane in the raw materials for the partially hydrolyzed/condensed product may be 90 mol % or more and 100 mol % or less, or 95 mol % or more and 100 mol % or less. It is preferable that the partially hydrolyzed/condensed product as the component (B) has no glycidyloxy group.

The component (B) is a component that acts as an auxiliary agent for a curing agent (an organoaluminum compound and/or organotitanium compound (E) described later), and can accelerate the curing reaction of the organopolysiloxane (A) having a glycidyloxy group in the presence of the curing agent. By blending the component (B) with the organopolysiloxane (A) having a glycidyloxy group, the scratch resistance of the formed cured product can be improved while a sufficient pot life is maintained. Further, the hot water resistance and chemical resistance of the cured product and adhesion of the cured product to a base material can also be improved. The effect of improving the scratch resistance of the cured product by blending the component (B) is an effect specific to the glycidyloxy group-containing organopolysiloxane. The scratch resistance of the cured product is not significantly improved by blending the component (B) with an epoxy group-containing organic compound in the absence of the glycidyloxy group-containing organopolysiloxane.

The aryl in the component (B) refers to a substituted or unsubstituted aromatic hydrocarbon group. The number of carbon atoms in the aryl is not particularly limited, and may be, for example, about 6 to 20, preferably 6 to 12, more preferably 6 to 8. Specific examples of the aryl include a phenyl group, a tolyl group, a xylyl group and a naphthyl group. A phenyl group is preferable.

The component (B) is not particularly limited, and examples thereof include triphenylalkoxysilanes such as triphenylmethoxysilane, triphenylethoxysilane and triphenylpropoxysilane; diphenyldialkoxysilanes such as diphenyldimethoxysilane, diphenyldiethoxysilane and diphenyldipropoxysilane; triphenylsilanol which is a hydrolysate of a triphenylalkoxysilane; diphenylsilanediol which is a hydrolysate of a diphenyldialkoxysilane; partially hydrolyzed/condensed products of triphenylalkoxysilanes; and partially hydrolyzed/condensed products of diphenyldialkoxysilanes. Only one of these compounds may be used, or two or more thereof may be used. Among them, at least one selected from the group consisting of triphenylmethoxysilane, triphenylsilanol, diphenyldimethoxysilane and diphenyldisilanol is preferable.

From the viewpoint of an excellent effect of extending the pot life, the component (B) may be at least one selected from the group consisting of a triarylalkoxysilane, a diaryldialkoxysilane and a partially hydrolyzed/condensed product thereof, or at least one selected from the group consisting of a triphenyl alkoxysilane, a diphenyl dialkoxysilane and a partially hydrolyzed/condensed product thereof. The number of carbon atoms in the alkoxy group of the triarylalkoxysilane, the diaryldialkoxysilane, the partially hydrolyzed/condensed product thereof, or the like may be, for example, 1 to 6, 1 to 3, 1 to 2, or 1.

The amount of the component (B) blended can be appropriately determined in view of an effect achieved thereby, and may be 2 parts by weight or more and 20 parts by weight or less based on 100 parts by weight of a total of an epoxy group-containing component containing the organopolysiloxane (A). When the amount of the component (B) blended is 2 parts by weight or more and 20 parts by weight or less, the effect of improving scratch resistance by blending the component (B) can be further improved. The amount may be 3 parts by weight or more and 15 parts by weight or less, or 4 parts by weight or more and 10 parts by weight or less. Here, the above-described epoxy group-containing component includes the organopolysiloxane (A) having a glycidyloxy group, and when an organic compound (D) described later has an epoxy group, the organic compound is also included in the epoxy group-containing component.

(β-Dicarbonyl Compound (C))

The resin composition according to one or more embodiments may further contain a β-dicarbonyl compound (C). When the β-dicarbonyl compound (C) is blended, the organopolysiloxane (A) having a glycidyloxy group can be stabilized to extend the pot life of the resin composition. In particular, in one or more embodiments where the organopolysiloxane (A) having a glycidyloxy group further has an epoxy cyclohexyl group, the effect of extending the pot life by blending the β-dicarbonyl compound (C) is remarkable.

The β-dicarbonyl compound refers to a compound having a structure in which two carbonyl groups are bonded to each other with one carbon atom sandwiched therebetween. The β-dicarbonyl compound is not particularly limited, and examples thereof include β-diketones, β-diesters and β-ketoesters, e.g. acetylacetone, dimethone, cyclohexane-1,3-dione, methyl acetoacetate, ethyl acetoacetate, dimethyl malonate, diethyl malonate and meldrum acid. From the viewpoint of cost and availability, acetylacetone, methyl acetoacetate or ethyl acetoacetate is preferable. Acetylacetone is preferable because it has a boiling point of about 140° C., and is thus easily volatilized during thermal curing. Methyl acetoacetate and ethyl acetoacetate have boiling points of about 170° C. and 180° C., respectively, and are less likely to volatilize than acetylacetone, but are preferable because they have a more remarkable pot life extending effect, and can exhibit a pot life extending effect even when used in a small amount.

The amount of the β-dicarbonyl compound (C) blended can be appropriately determined according to the physical properties of the cured product, and is preferably 0.5 parts by weight or more and 50 parts by weight or less based on 100 parts by weight of the organopolysiloxane (A). When the amount of the component (C) blended is 0.5 parts by weight or more, it is possible to obtain an effect of extending the pot life by addition of the component (C), and when the amount of the component (C) blended is 50 parts by weight or less, it is possible to improve the scratch resistance of the cured product and suppress generation of cracks due to shrinkage by curing. The amount may be 1 parts by weight or more and 30 parts by weight or less, or 3 parts by weight or more and 20 parts by weight or less.

(Organic Compound (D))

The resin composition according to one or more embodiments may further contain an organic compound (D) having one or more of an epoxy group, an oxetanyl group and a vinyl ether group. By blending such an organic compound (D), the chemical resistance and/or crack resistance of the resulting cured product can be improved. The organic compound is different from the organopolysiloxane (A), does not contain a polysiloxane structure, and includes carbon atoms, oxygen atoms and hydrogen atoms. Further, the compound may have nitrogen atoms. It is preferable that the compound does not contain silicon atoms. The organic compound (D) may be a compound which is compatible with the organopolysiloxane (A) having a glycidyloxy group and does not inhibit a crosslinking reaction between epoxy groups.

From the viewpoint of compatibility with the component (A), the molecular weight of the organic compound (D) may be 200 or more and 2,000 or less, 200 or more and 1,000 or less, or 200 or more and 500 or less.

The organic compound (D) may be an organic compound having an epoxy group or an oxetanyl group, or an organic compound having an epoxy group because the organic compound has reactivity with the component (A), and can be co-crosslinked, and a cured product excellent in physical properties is obtained. The organic compound having an epoxy group is not particularly limited, and is preferably an organic compound having one or two epoxy groups per molecule. Specific examples thereof include aromatic epoxides, alicyclic epoxides and aliphatic epoxides.

Examples of the aromatic epoxide include glycidyl ethers of monohydric or polyhydric phenols having at least one aromatic ring (e.g. phenol, bisphenol A, phenol novolac and alkylene oxide adducts thereof).

Examples of the alicyclic epoxide include alicyclic epoxy compounds such as 3,4-epoxycyclohexylmethyl-3',4'-epoxycyclohexanecarboxylate (e.g. trade name "CELLOXDE 2021 P" manufactured by Daicel Chemical Industries, Ltd.), hydrogenated bisphenol A diglycidyl ether (e.g. trade name "EPOLITE 4000" manufactured by KYOEISHA CHEMICAL Co., LTD.), epsilon-caprolactone-modified 3,4-epoxycyclohexylmethyl-3',4'-epoxycyclohexanecarboxylate (e.g. trade name "CELLOXIDE 2081" manufactured by Daicel Chemical Industries, Ltd), 1,2,8,9-diepoxylimonene (e.g. trade name "CELLOXIDE 3000" manufactured by Daicel Chemical Industries, Ltd.), vinylcyclohexene monooxide-1, 2-epoxy-4-vinylcyclohexane (e.g. trade name "CELLOXIDE 2000" manufactured by Daicel Chemical Industries, Ltd.), 1,2-epoxy-4-(2-oxiranyl) cyclohexane adducts of 2,2-bis(hydroxymethyl)-1-butanol (e.g. trade name "EHPE-3150" manufactured by Daicel Chemical Industries, Ltd.), and bis-(3,4-epoxycyclohexyl)adipate; epoxy compounds in which epoxy is added directly or via a hydrocarbon to a cyclic aliphatic hydrocarbon; and alicyclic epoxides such as heterocyclic ring-containing epoxy compounds such as triglycidyl isocyanurate. Among them, epoxy compounds having an epoxy cyclohexyl group are preferable, and 3,4-epoxycyclohexylmethyl-3',4'-epoxycyclohexanecarboxylate and hydrogenated bisphenol A diglycidyl ether are more preferable.

Examples of the aliphatic epoxide include polyglycidyl ether of aliphatic polyhydric alcohols or alkylene oxide adducts thereof (e.g. 1,4-butanediol diglycidyl ether and 1,6-hexanediol diglycidyl ether), polyglycidyl esters of aliphatic polybasic acids (e.g. diglycidyl tetrahydrophthalate), and epoxidized products of long-chain unsaturated compounds (e.g. epoxidized soybean oil and epoxidized polybutadiene).

The amount of the organic compound (D) blended may be 1 part by weight or more and 200 parts by weight or less based on 100 parts by weight of the organopolysiloxane (A). When the amount of the component (D) blended is 1 part by weight or more, an effect of improving crack resistance by blending the component (D) can be obtained, and when the amount of the component (D) blended is 200 parts by weight or less, good compatibility is exhibited between the component (A) and the component (D), the transparency of the resin composition or the cured product can be improved, and the chemical resistance of the cured product can be improved. The amount may be 5 parts by weight or more and 100 parts by weight or less, or 10 parts by weight or more and 60 parts by weight or less. In particular, when the amount of the component (D) blended is 60 parts by weight or less, cloudiness of the resin composition or the cured product can be effectively prevented.

(Other Additives)

In production of the resin composition of one or more embodiments, other additives may be appropriately blended in addition to the above-described components. Examples of such additives include inorganic fillers, inorganic pigments, organic pigments, plasticizers, dispersants, wetting agents, thickeners and antifoaming agents. The resin composition of one or more embodiments optionally contains a reactive resin such as an acrylic resin or a vinyl resin having a hydrolyzable silyl group.

The inorganic filler is not particularly limited, and examples thereof include silica-based inorganic fillers such as quartz, fumed silica, precipitated silica, silicic anhydride, fused silica, crystalline silica and ultrafine powder amorphous silica, alumina, zircon, titanium oxide, zinc oxide, silicon nitride, boron nitride, aluminum nitride, silicon carbide, glass fiber, alumina fiber, carbon fiber, mica, black lead, carbon black, graphite, diatomaceous earth, white earth clay, talc, aluminum hydroxide, calcium carbonate, magnesium carbonate, barium sulfate, potassium titanate, calcium silicate, inorganic balloon and silver powder.

The inorganic filler may be subjected to surface treatment as appropriate. Examples of the surface treatment method include alkylation treatment, trimethylsilylation treatment, silicone treatment, and treatment with a coupling agent.

Examples of the coupling agent include silane coupling agents. The silane coupling agent is not particularly limited as long as it is a compound having at least one functional group reactive with an organic group and at least one hydrolyzable silicon group. The functional group reactive with an organic group may be at least one selected from an epoxy group, a methacrylic group, an acrylic group, an isocyanate group, an isocyanurate group, a vinyl group and a carbamate group from the viewpoint of handleability, or an epoxy group, a methacrylic group or an acrylic group from the viewpoint of curability and bondability. The hydrolyzable silicon group may be an alkoxysilyl group from the viewpoint of handleability, or a methoxysilyl group or an ethoxysilyl group from the viewpoint of reactivity.

Examples of the preferred silane coupling agent include alkoxysilanes having an epoxy group, such as 3-glycidoxypropyltrimethoxysilane, 3-glycidoxypropyltriethoxysilane, 2-(3,4-epoxycyclohexyl)ethyltrimethoxysilane, and 2-(3,4-epoxycyclohexyl)ethyltriethoxysilane; and alkoxysilanes having a methacrylic group or an acrylic group, such as 3-methacryloxypropyltrimethoxysilane, 3-methacryloxypropyltriethoxysilane, 3-acryloxypropyltrimethoxysilane, 3-acryloxypropyltriethoxysilane, methacryloxymethyltrimethoxysilane, methacryloxymethyltriethoxysilane, acryloxymethyltrimethoxysilane and acryloxymethyltriethoxysilane.

A solvent can be blended with the resin composition according to one or more embodiments. The solvent is not particularly limited, and when the base material to which the multi-liquid curable resin composition described later is applied is made of plastic, ketones such as methyl isobutyl ketone and diisobutyl ketone, alcohols such as butanol and isopropyl alcohol, esters such as butyl acetate and isobutyl acetate, and ethers such as diethylene glycol methyl ether, propylene glycol methyl ether and propylene glycol methyl ether acetate are preferable because the base material often has low solvent resistance. In particular, it is preferable to use an ether-based solvent in an amount of 30 wt % or more of all solvents from the viewpoint of preventing damage to the base material. The amount of the solvent blended can be appropriately set, and is preferably 0 part by weight or more and 300 parts by weight or less, more preferably 0 part by weight or more and 150 parts by weight or less, based on 100 parts by weight of the organopolysiloxane (A).

The method for mixing the components is not particularly limited, and a known method can be appropriately used. Examples thereof include a method in which components are blended, and stirred using a hand mixer or a static mixer; a method in which components are kneaded at room temperature or under heating using a planetary mixer, a disper, a roll, a kneader or the like; and a method in which components are dissolved using a small amount of a suitable solvent, and the solution is stirred (Multi-Liquid Curable Resin Composition)

Preferably, the multi-liquid curable resin composition of one or more embodiments has a two-liquid form including at least a first liquid and a second liquid. In the two-liquid form including a main agent and a curing agent, it is preferable that the main agent is the resin composition, i.e. a resin composition containing the organopolysiloxane (A) having a glycidyloxy group, at least one selected from the group consisting of a triarylalkoxysilane, a diaryldialkoxysilane, a hydrolysate thereof and a partially hydrolyzed/condensed product thereof (B), optionally the β-dicarbonyl compound (C), and optionally the organic compound (D), and on the other hand, the curing agent includes an organoaluminum compound and/or organotitanium compound (E). However, the β-dicarbonyl compound (C) and/or the organic compound (D) may be contained in the curing agent.

(Organoaluminum Compound and/or Organotitanium Compound (E))

The organoaluminum compound and/or organotitanium compound (E) is a component that promotes the curing reaction of the organopolysiloxane (A) having a glycidyloxy group by promoting the crosslinking reaction between epoxy groups. In addition, the scratch resistance of the cured product can be improved. As the organoaluminum compound and/or organotitanium compound, only one compound may be used, or two or more compounds may be used in combination.

Examples of the organoaluminum compound include aluminum alkoxide compounds, aluminum acetoacetate compounds, aluminum ethylacetoacetate compounds and aluminum acetylacetonate compounds. More specific examples include aluminum triisopropoxide, aluminum tri-secondary butoxide, diisopropoxy mono-secondary butoxyaluminum, diisopropoxy ethyl acetoacetate aluminum, diisopropoxy acetylacetonate aluminum, isopropoxy bis(ethylacetoacetate) aluminum, isopropoxy bis(acetylacetonate) aluminum, tris(ethylacetoacetate) aluminum, tris(acetylacetonate) aluminum and monoacetylacetonate bis(ethylacetoacetate) aluminum.

Examples of the organotitanium compound include titanium alkoxide compounds, titanium acetoacetate compounds, titanium ethyl acetoacetate compounds and titanium acetylacetonate compounds. More specific examples thereof include diisopropoxy-bis(ethylacetoacetate) titanium, diisopropoxy-bis(acetylacetate) titanium, diisopropoxy-bis(acetylacetate) titanium, tetra-i-propoxytitanium, tetra-n-butoxytitanium, tetra-t-butoxytitanium and tetrakis(2-ethylhexyloxy) titanium.

The amount of the organoaluminum compound and/or organotitanium compound (E) added can be appropriately determined according to the physical properties of the cured product, and is preferably 0.5 parts by weight or more and 10 parts by weight or less based on 100 parts by weight of the organopolysiloxane (A). When the amount of the component (E) added is 0.5 parts by weight or more, it is possible to obtain an effect of promoting the curing reaction by blending the component (E) and an effect of improving scratch resistance, and the amount of the component (E) added is 10 parts by weight or less, it is possible to achieve a practical pot life. The amount may be 0.5 parts by weight or more and 5 parts by weight or less, or 2 parts by weight or more and 5 parts by weight or less.

(Cured Product)

The cured product of one or more embodiments is one formed by mixing the resin composition with (E) the organoaluminum compound and/or organotitanium compound, and curing the mixture. The cured product may be formed by mixing a first liquid (main agent) and a second liquid (curing agent) forming the multi-liquid curable resin composition, and curing the obtained mixture by heating.

The heating temperature for curing the mixture is not particularly limited, and is typically 50° C. or higher and 200° C. or lower, preferably 60° C. or higher and 120° C. or lower, more preferably 70° C. or higher and 110° C. or lower, still more preferably 80° C. or higher and 100° C. or lower. The multi-liquid curable resin composition according to one or more embodiments can form a cured product having excellent scratch resistance and chemical resistance even when cured at a relatively low temperature of 60° C. or higher and 120° C. or lower.

The heating time for curing the mixture is not particularly limited, and is preferably 10 to 120 minutes, more preferably 15 to 100 minutes, still more preferably 30 to 60 minutes, from the viewpoint of securing both low cost and the degree of procession of the curing reaction.

(Application)

The multi-liquid curable resin composition or cured product of one or more embodiments can be used for various applications. The multi-liquid curable resin composition or cured product can be applied, to for example, transparent materials, optical materials, optical lenses, optical films, optical sheets, adhesives for optical components, optical adhesives for bonding optical waveguides, adhesives for fixing optical waveguide peripheral members, adhesives for bonding DVDs, pressure sensitive adhesives, dicing tapes, electronic materials, insulating materials (including printed circuit boards, cable sheaths and the like), high-voltage insulating materials, interlayer insulating films, an insulating packings, insulating coating materials, adhesives, high-heat-resistance adhesives, optical adhesives, adhesives for LED elements, adhesives for various substrates, adhesives for heat sinks, paints, inks, coloring inks, coating materials (including hard coatings, sheets, films, optical disk coatings, optical fiber coatings and the like), molding materials (sheets, films, FRPs and the like), sealing materials, potting materials, additives, encapsulating materials for light emitting diodes, reflectors and reflecting plates for light emitting diodes, photosemiconductor encapsulating materials, liquid crystal sealing agents, sealing agents for display devices, encapsulating materials for electrical materials, encapsulating materials for solar cells, high-heat-resistance sealing material, resist materials, colored resists, dry film resist materials, solder resist materials, materials for color filters, stereolithography, materials for electronic paper, materials for holograms, materials for solar cells, materials for fuel cells, display materials, recording materials, vibration-proof materials, waterproof materials, moisture-proof materials, heat-shrinkable rubber tubes, O-rings, photosensitive drums for copiers, solid electrolytes for batteries, and gas separation films. The multi-liquid curable resin composition or cured product can also be applied to concrete protective materials, linings, soil injection agents, cold storage materials, sealing material for sterilization treatment apparatuses, contact lenses, oxygen-enriched films, additives for resins, and the like.

In addition, a laminate containing the cured product of one or more embodiments can be obtained by mixing the first liquid and the second liquid of the multi-liquid curable resin composition, applying the resulting mixture to a base material, and curing the mixture by heating with a heat source to form a cured coating film. The laminate can be suitably used for front plates of personal computers, smartphones, tablets and the like, windowpanes of automobiles and the like, protective material for lamps of automobiles and the like, films and the like.

The base material is not particularly limited, and may be, for example, metal (e.g. aluminum, SUS, copper or iron), ceramics, glass, cement, a ceramic-based base material, a stone material, plastic (e.g. polycarbonate (PC), acrylic, ABS, PC-ABS alloy or polyethylene terephthalate (PET)), wood, paper, fiber or the like. The base material may be a film or a sheet. The multi-liquid curable resin composition of one or more embodiments can be suitably used for coating automobiles, buildings, home appliances, industrial equipment and the like. The multi-liquid curable resin composition of one or more embodiments is cured by heating, and is therefore suitable particularly for forming a coating film on a surface of a base material having a complicated shape. As described above, the multi-liquid curable resin composition can attain excellent scratch resistance and chemical resistance even when cured at a relatively low temperature of 60° C. or higher and 120° C. or lower. Thus, even when the base material is an organic base material, damage to the base material due to heating during curing can be suppressed. Therefore, the multi-liquid curable resin composition can be suitably used even for an organic base material.

The thickness of the cured coating film formed from the multi-liquid curable resin composition of one or more embodiments may be 1 μm or more and 100 μm or less. When the thickness of the film is 1 μm or more, the scratch resistance and the water resistance of the film are improved, and when the thickness of the film is 100 μm or less, cracks are less likely to be generated due to shrinkage by curing. The thickness may be 5 μm or more and 100 μm or less, or 10 μm or more and 50 μm or less, or 15 μm or more and 40 μm or less.

EXAMPLES

Hereinafter, one or more embodiments of the present invention will be described in further detail by way of examples, but the embodiments of present invention are not limited to these examples. The substances used in Examples and Comparative Examples are as follows.

Alkoxysilane Compound
    Me (OFS-6070: methyltrimethoxysilane manufactured by Dow Toray Co., Ltd., molecular weight: 136.2)
    Ge (OFS-6040: 3-glycidyloxypropyltrimethoxysilane manufactured by Dow Toray Co., Ltd., molecular weight: 236.3)
    EC (KBM-303: 2-(3,4-epoxycyclohexyl)ethyltrimethoxysilane manufactured by Shin-Etsu Chemical Co., Ltd., molecular weight: 246.3)

Condensation Catalyst (Neutral Salt)
    LiCl (lithium chloride manufactured by Tokyo Chemical Industry Co., Ltd., molecular weight: 42.4)

Organic Compound (D)
    CELLOXIDE 2021 P (3,4-epoxycyclohexylmethyl-3',4'-epoxycyclohexanecarboxylate, manufactured by Daicel Corporation, molecular weight: 252.3)
    "EPOLITE 4000" (hydrogenated bisphenol A diglycidyl ether manufactured by KYOEISHA CHEMICAL Co., LTD., molecular weight: 353)

β-Dicarbonyl Compound (C)
    EAA (ethyl acetoacetate manufactured by Tokyo Chemical Industry Co., Ltd., molecular weight: 130.1)

AcAc (acetylacetone manufactured by Tokyo Chemical Industry Co., Ltd., molecular weight: 100.1)

Component (B)

DPDM (diphenyldimethoxysilane manufactured by Tokyo Chemical Industry Co., Ltd., molecular weight: 244.4)

DPS (diphenylsilanediol manufactured by Tokyo Chemical Industry Co., Ltd., molecular weight: 216.3)

TPS (triphenylsilanol manufactured by Tokyo Chemical Industry Co., Ltd., molecular weight: 276.4)

Organoaluminum Compound (E)

ALCH (aluminum trisethyl acetoacetate manufactured by Kawaken Fine Chemicals Co., Ltd., molecular weight: 414.4)

Leveling Agent

BYK 300 (silicone-based leveling agent manufactured by BYK JAPAN KK.)

Solvent

PMA (propylene glycol methyl ether acetate manufactured by Tokyo Chemical Industry Co., Ltd., molecular weight: 132.2)

(Organopolysiloxane Reaction Time)

An alkoxysilane compound, a condensation catalyst and water were mixed at room temperature, the mixture was heated in an oil bath heated to 90° C. The mixture was reacted for 6 hours, where the time at which the internal temperature reached 70° C. was defined as a starting point, and the time duration during which thereafter the mixture was heated in an oil bath at 90° C. was defined as a reaction time.

(Removal of Alcohol in Synthesis of Organopolysiloxane)

The resin solution obtained by reacting the mixture for 6 hours as described above includes an organopolysiloxane, alcohol generated in the process of the reaction, and a slight amount of remaining water. To remove volatile components other than the organopolysiloxane by devolatilization under reduced pressure using an evaporator and an aspirator, devolatilization was performed while the resin solution was heated in an oil bath heated, so that methanol and water in the amounts described in Table 1 were removed to obtain an organopolysiloxane.

The amount of alcohol required to be removed by devolatilization was calculated in accordance with the following formula.

Amount of water added×32/18×2×100%

The weight of the total alcohol that can be generated was calculated on the assumption that 1 mole of alcohol is generated per 1 mole of alkoxysilyl groups in the organoalkoxysilane used in the reaction. For example, 1 mole of trimethoxysilyl groups include 3 moles of methoxysilyl groups, and generate 3 moles of methanol, and 1 mole of methyldimethoxysilyl groups include 2 moles of methoxysilyl groups, and generate 2 moles of methanol. In addition, 1 mole of water causes generation of 1 mole of silanol groups and 1 mole of alcohol from 1 mole of alkoxysilyl groups. Further, 1 mole of the silanol groups generated react with 1 mole of alkoxysilyl groups to generate 1 mole of alcohol. That is, 2 moles of alcohol is generated from 1 mole of water.

(Synthesis Example 1) Synthesis of Organopolysiloxane 2.6 g of Me, 178.4 g of Ge, 0.018 g of LiCl and 25.1 g of pure water (60 mol % with respect to the alkoxysilyl group) were added into a 300 ml four-necked flask, and heated in an oil bath set at 90° C., and were reacted for 6 hours. 43.8 g of PMA was added, heating/devolatilization under reduced pressure was performed using an evaporator and an oil bath, so that a total of 78.5 g of generated methanol and residual water were removed. Further, adjustment was performed by addition of 28.6 g of PMA to a nonvolatile content (NV) of 60% to obtain about 200 g of an organopolysiloxane solution. The weight average molecular weight was 23000, and the results of $^{29}$Si-NMR measurement showed that the ratio of T1/T2/T3 was 0/7/93, the value of [T3/(Q1+Q2+Q3+Q4+T1+T2+T3+D1+D2+M1)]×100 was 93%, and the condensation ratio was 98%.

(Synthesis Example 2) Synthesis of Organopolysiloxane 2.6 g of Me, 176.6 g of Ge, 1.8 g of EC, 0.018 g of LiCl and 25.1 g of pure water (60 mol % with respect to the alkoxysilyl group) were added into a 300 ml four-necked flask, and heated in an oil bath set at 90° C., and were reacted for 6 hours. 43.8 g of PMA was added, heating/devolatilization under reduced pressure was performed using an evaporator and an oil bath, so that a total of 78.4 g of generated methanol and residual water were removed. Further, adjustment was performed by addition of 28.6 g of PMA to a NV of 60% to obtain about 200 g of an organopolysiloxane solution. The weight average molecular weight was 29000, and the results of $^{29}$Si-NMR measurement showed that the ratio of T1/T2/T3 was 0/8/92, the value of [T3/(Q1+Q2+Q3+Q4+T1+T2+T3+D1+D2+M1)]×100 was 92%, and the condensation ratio was 97%.

(Synthesis Example 3) Synthesis of Organopolysiloxane 2.6 g of Me, 169.4 g of Ge, 8.9 g of EC, 0.018 g of LiCl and 25.0 g of pure water (60 mol % with respect to the alkoxysilyl group) were added into a 300 ml four-necked flask, and heated in an oil bath set at 90° C., and were reacted for 6 hours. 43.8 g of PMA was added, heating/devolatilization under reduced pressure was performed using an evaporator and an oil bath, so that a total of 78.3 g of generated methanol and residual water were removed. Further, adjustment was performed by addition of 28.6 g of PMA to a NV of 60% to obtain about 200 g of an organopolysiloxane solution. The weight average molecular weight was 21000, and the results of $^{29}$Si-NMR measurement showed that the ratio of T1/T2/T3 was 0/3/97, the value of [T3/(Q1+Q2+Q3+Q4+T1+T2+T3+D1+D2+M1)]×100 was 97%, and the condensation ratio was 98%.

(Synthesis Example 4) Synthesis of Organopolysiloxane 2.6 g of Me, 160.4 g of Ge, 17.7 g of EC, 0.018 g of LiCl and 24.9 g of pure water (60 mol % with respect to the alkoxysilyl group) were added into a 300 ml four-necked flask, and heated in an oil bath set at 90° C., and were reacted for 6 hours. 43.8 g of PMA was added, heating/devolatilization under reduced pressure was performed using an evaporator and an oil bath, so that a total of 78.0 g of generated methanol and residual water were removed. Further, adjustment was performed by addition of 28.6 g of PMA to a NV of 60% to obtain about 200 g of an organopolysiloxane solution. The weight average molecular weight was 24000, and the results of $^{29}$Si-NMR measurement showed that the ratio of T1/T2/T3 was 0/9/91, the value of [T3/(Q1+Q2+Q3+Q4+T1+T2+T3+D1+D2+M1)]×100 was 91%, and the condensation ratio was 97%.

(Synthesis Example 5) Synthesis of Organopolysiloxane 2.6 g of Me, 142.4 g of Ge, 35.5 g of EC, 0.018 g of LiCl and 24.8 g of pure water (60 mol % with respect to the alkoxysilyl group) were added into a 300 ml four-necked flask, and heated in an oil bath set at 90° C., and were reacted for 6 hours. 43.8 g of PMA was added, heating/devolatilization under reduced pressure was performed using an evaporator and an oil bath, so that a total of 77.6 g of generated methanol and residual water were removed. Further, adjustment was performed by addition of 28.6 g of PMA to a NV of 60% to obtain about 200 g of an organopolysiloxane solution. The weight average molecular weight was 19000, and the results of $^{29}$Si-NMR measurement showed that the ratio of T1/T2/T3 was 0/10/90, the value of [T3/(Q1+Q2+Q3+Q4+T1+T2+T3+D1+D2+M1)]×100 was 90%, and the condensation ratio was 97%.

(Synthesis Example 6) Synthesis of Organopolysiloxane 2.6 g of Me, 175.5 g of EC, 0.018 g of LiCl and 23.7 g of pure water (60 mol % with respect to the alkoxysilyl group) were added into a 300 ml four-necked flask, and heated in an oil bath set at 90° C., and were reacted for 6 hours. 43.8 g of PMA was added, heating/devolatilization under reduced pressure was performed using an evaporator and an oil bath, so that a total of 74.2 g of generated methanol and residual water were removed. Further, adjustment was performed by addition of 28.6 g of PMA to a NV of 60% to obtain about 200 g of an organopolysiloxane solution. The weight average molecular weight was 18000, and the results of $^{29}$Si-NMR measurement showed that the ratio of T1/T2/T3 was 0/14/86, the value of [T3/(Q1+Q2+Q3+Q4+T1+T2+T3+D1+D2+M1)]×100 was 86%, and the condensation ratio was 95%.

Tosoh Corporation as a column, and THF as a solvent, and the weight average molecular weight was calculated in terms of polystyrene.

($^{29}$Si-NMR)

The constituent units derived from the monoorganotrialkoxysilane are classified into a constituent unit T0 which does not form a siloxane bond, a constituent unit T1 forming one siloxane bond, a constituent unit T2 forming two siloxane bonds, and a constituent unit T3 forming three siloxane bonds. Using AVANCEIIIHD 500 manufactured by BRUKER, $^{29}$Si-NMR of the organopolysiloxane was measured with deuterated chloroform as a solvent, and the ratios of the areas of peaks derived from T1, T2 and T3 structures to the total area of the peaks were defined as the ratios, respectively, of T1, T2 and T3 contained in the organopolysiloxane. In each synthesis example, Q1 to Q4, D1 to D2 and M1 structures are not included, and the ratio thereof is 0.

(Condensation Ratio)

The value calculated from the expression: (1×X+2×Y+3×Z)/3 was defined as a condensation ratio (siloxane bond formation ratio), where the ratios (%) of T1, 12 and T3 structures are X, Y and Z, respectively.

Example 1

10.0 g of the organopolysiloxane solution obtained in Synthesis Example 1, 0.70 g of DPDM, 0.039 g of BYK 300, 0.39 g of ALCH and 9.1 g of PMA were mixed to obtain a clear coating solution. The obtained clear coating solution was applied onto an ABS plate of 50×150×2 mm with each of Nos. 40 to 60 bar coaters, and placed in a hot air dryer set at 80° C. for 30 minutes, so that the solvent was removed

TABLE 1

| | | | | | | | (unit: g) |
|---|---|---|---|---|---|---|---|
| | | Synthesis Example 1 | Synthesis Example 2 | Synthesis Example 3 | Synthesis Example 4 | Synthesis Example 5 | Synthesis Example 6 |
| Synthesis | Me | 2.6 | 2.6 | 2.6 | 2.6 | 2.6 | 2.6 |
| | Ge | 178.4 | 176.6 | 169.4 | 160.4 | 142.4 | 0 |
| | EC | 0 | 1.8 | 8.9 | 17.7 | 35.5 | 175.5 |
| | LiCl | 0.018 | 0.018 | 0.018 | 0.018 | 0.018 | 0.018 |
| | Water | 25.1 | 25.1 | 25.0 | 24.9 | 24.8 | 23.7 |
| Distillation | PMA | 43.8 | 43.8 | 43.8 | 43.8 | 43.8 | 43.8 |
| | Amount of removed methanol and water | −78.5 | −78.4 | −78.3 | −78.0 | −77.6 | −74.2 |
| Preparation | PMA | 28.6 | 28.6 | 28.6 | 28.6 | 28.6 | 28.6 |
| Total withdrawal amount | | 200 | 200 | 200 | 200 | 200 | 200 |

(NV (Nonvolatile Content))

In a hot air dryer set at 105° C., 100 mg of a sample is left standing for 30 minutes, and the amount of the sample remaining without being volatilized is abbreviated as NV, and calculated from the following expression.

NV=(weight of sample remaining after 30 minutes at 105° C.)/100 mg×100

1−NV means a content of volatile components.

(Weight Average Molecular Weight)

The weight average molecular weight of the organopolysiloxane was measured by GPC. GPC was performed using HLC-8320 GPC manufactured by Tosoh Corporation as a liquid feeding system, TSK-GEL H Type manufactured by and the coating film was cured to obtain a cured coating film laminate.

Examples 2 to 12 and Comparative Examples 1 to 5

Except that the formulation was changed to the formulations shown in Tables 2 and 3, the same procedure as in Example 1 was carried out to obtain a clear coating solution and a cured coating film laminate.

(Pot Life)

The components forming the clear coating liquid were mixed, and then left standing at room temperature, and the time until gelation of the mixture was visually determined. Tables 2 and 3 show the results.
D: The time until gelation is less than 3 hours.
C: The time until gelation is 3 hours or more and less than 6 hours.
B: The time until gelation is 6 hours or more and less than 12 hours.
A: The time during which gelation does not occur is 12 hours or more.

(Scratch Resistance)

Using an eraser abrasion tester [manufactured by Mitsumoto Seisakujo K. K.], steel wool #0000 was placed under a load of 500 g/cm$^2$, and made to reciprocate 10 times with a stroke length of 3 cm on the surface of the cured coating film prepared using a No. 60 bar coater. The gloss values of the test portion and non-test portion at 60° were measured with a glossmeter, and the gloss retention ratio was calculated. The scratch resistance was evaluated on the basis of the calculated value. Tables 2 and 3 show the results.

Gloss retention ratio (%)=(gloss value of test portion at 60°/gloss value of non-test portion at 60°)×100

D: The gloss retention ratio is 80% or less.
C: The gloss retention ratio is more than 80% and 90% or less.
B: The gloss retention ratio is more than 90% and 95% or less.
A: The gloss retention ratio is more than 95%.

(Hot Water Resistance)

The cured coating film laminate prepared using a No. 60 bar coater was immersed in hot water at 60° C. for 24 hours, taken out, then wiped to remove water droplets on the surfaces of the laminate, and dried at room temperature for 2 hours, followed by examining a change in appearance of the cured coating film by visual observation. Tables 2 and 3 show the results.
C: There is a change in smoothness such as peeling and creases.
B: There is no change in smoothness, and there is a change in color tone such as whitening.
A: There is no change in appearance.

(Chemical Resistance)

About 0.5 ml of a 10% lactic acid aqueous solution was dropped onto the cured coating film prepared using each of Nos. 40 to 60 bar coaters, and the cured coating film was left standing for 24 hours in a hot air dryer adjusted to 80° C. After 24 hours, the test piece was taken out, the remaining lactic acid droplet on the surface of the coating film was wiped off, and a change in appearance of the cured coating film was visually observed. Tables 2 and 3 show the results.

D: Delamination or wrinkling occurs in the coating film prepared using the No. 60 bar coater.
C: There is no change in appearance in the coating film prepared using the No. 60 bar coater. Slight wrinkling occurs in the coating film prepared using the No. 50 bar coater.
B: There is no change in appearance in the coating film prepared using the No. 50 bar coater. Slight wrinkling occurs in the coating film prepared using the No. 40 bar coater.
A: There is no change in appearance in the coating film prepared using the No. 40 bar coater.

(Adhesion)

The cured coating film prepared using the No. 60 bar coater was notched with a cutter so as to form 100 squares of 10×10 crosscuts at intervals of 1 mm, a cellophane tape (registered trademark) manufactured by Nichiban Co., Ltd. was attached onto the cut, the cured coating film was vigorously peeled off by 90° in an upward direction, and whether or not the cured coating film was peeled off from the base material was visually observed. Score-based evaluation was performed on a one point per square basis, where a score of 100 was given when the cured coating film perfectly adhered, and a score of 0 was given when the cured coating film was completely peeled off. Tables 2 and 3 show the results.

C: A score of less than 100 is given in the adhesion test conducted on a cured coating film laminate immediately after curing.
B: A score of 100 is given in the adhesion test conducted on a cured coating film laminate immediately after curing, but a score of less than 100 is given in the adhesion test conducted with a cured coating film laminate immersed in hot water at 60° C. for 24 hours, taken out and immediately wiped lightly to remove water.
A: A score of 100 is given in the adhesion test conducted with a aired coating film laminate immersed in hot water at 60° C. for 24 hours, taken out and immediately wiped lightly to remove water.

(Resistance to Cracking Under Moisture and Heat)

The cured coating film laminate prepared by the No. 60 bar coater was placed in a thermohygrostat adjusted to 80° C. and 95%, and whether cracks were generated was visually determined every about 50 hours. When cracks were generated, the latest time at which it was determined that cracks were not generated was recorded. The maximum time was set to 500 hours, and when cracks were not generated after 500 hours, the time was considered more than 500 hours, and recorded as ">500 Hr".

TABLE 2

| | | | Example 1 | Example 2 | Example 3 | Example 4 | Example 5 | Example 6 |
|---|---|---|---|---|---|---|---|---|
| Composition (unit: g) | Organopolysiloxane | Synthesis Example 1 | 10 | 10 | 10 | 10 | 10 | |
| | | Synthesis Example 2 | | | | | | 10 |
| | | Synthesis Example 3 | | | | | | |
| | | Synthesis Example 4 | | | | | | |
| | | Synthesis Example 5 | | | | | | |
| | Component (D) | CELLOXIDE 2021 P | | 3.0 | 3.0 | | | 3.0 |
| | | EPOLITE 4000 | | | | | | |
| | Component (B) | DPDM | 0.70 | 1.00 | 1.00 | | | 1.00 |
| | | DPS | | | | 0.35 | | |
| | | TPS | | | | | 0.35 | |
| | Component (C) | EAA | | | 0.33 | | | 0.33 |
| | | AcAc | | | | | | |

TABLE 2-continued

|  |  |  |  |  |  |  |  |  |
|---|---|---|---|---|---|---|---|---|
| Evaluation | Leveling agent | BYK300 | 0.039 | 0.055 | 0.055 | 0.037 | 0.037 | 0.055 |
|  | Component (E) | ALCH | 0.39 | 0.55 | 0.55 | 0.37 | 0.37 | 0.55 |
|  | Solvent | PMA | 9.1 | 14.4 | 14.8 | 8.6 | 8.6 | 14.8 |
|  | NV (nonvolatile content) |  | 40% | 40% | 40% | 40% | 40% | 40% |
|  | Pot life |  | A | B | A | A | A | A |
|  | Initial gloss |  | 91 | 91 | 91 | 91 | 91 | 91 |
|  | Gloss of scratch test portion |  | 90 | 90 | 90 | 89 | 90 | 90 |
|  | Gloss retention ratio |  | 99% | 99% | 99% | 98% | 99% | 99% |
|  | Scratch resistance |  | A | A | A | A | A | A |
|  | Hot water resistance |  | A | A | A | A | A | A |
|  | Chemical resistance |  | C | B | B | C | C | B |
|  | Adhesion |  | A | A | A | A | A | A |
|  | Resistance to cracking under moisture and heat |  | 200 Hr | >500 Hr | >500 Hr | >500 Hr | >500 Hr | >500 Hr |

|  |  |  | Example 7 | Example 8 | Example 9 | Example 10 | Example 11 | Example 12 |
|---|---|---|---|---|---|---|---|---|
| Composition (unit: g) | Organopolysiloxane | Synthesis Example 1 |  |  |  |  |  |  |
|  |  | Synthesis Example 2 |  |  |  |  |  |  |
|  |  | Synthesis Example 3 | 10 |  |  |  |  |  |
|  |  | Synthesis Example 4 |  | 10 |  |  |  |  |
|  |  | Synthesis Example 5 |  |  | 10 | 10 | 10 | 10 |
|  | Component (D) | CELLOXIDE 2021 P | 3.0 | 3.0 | 3.0 | 7.0 |  | 3.0 |
|  |  | EPOLITE 4000 |  |  |  |  | 3.0 |  |
|  | Component (B) | DPDM | 1.00 | 1.00 | 1.00 | 1.40 | 1.00 | 1.00 |
|  |  | DPS |  |  |  |  |  |  |
|  |  | TPS |  |  |  |  |  |  |
|  | Component (C) | EAA | 0.33 | 0.33 | 0.33 | 0.46 | 0.33 |  |
|  |  | AcAc |  |  |  |  |  | 0.30 |
|  | Leveling agent | BYK300 | 0.055 | 0.055 | 0.055 | 0.077 | 0.055 | 0.055 |
|  | Component (E) | ALCH | 0.55 | 0.55 | 0.55 | 0.77 | 0.55 | 0.55 |
|  | Solvent | PMA | 14.8 | 14.8 | 14.8 | 22.0 | 14.8 | 14.8 |
|  | NV (nonvolatile content) |  | 40% | 40% | 40% | 40% | 40% | 40% |
| Evaluation | Pot life |  | A | A | A | B | A | A |
|  | Initial gloss |  | 92 | 92 | 91 | 91 | 91 | 91 |
|  | Gloss of scratch test portion |  | 89 | 91 | 87 | 87 | 89 | 87 |
|  | Gloss retention ratio |  | 97% | 99% | 96% | 96% | 96% | 96% |
|  | Scratch resistance |  | A | A | A | A | A | A |
|  | Hot water resistance |  | A | A | A | A | A | A |
|  | Chemical resistance |  | A | A | A | A | A | A |
|  | Adhesion |  | A | A | A | A | A | A |
|  | Resistance to cracking under moisture and heat |  | >500 Hr | >500 Hr | >500 Hr | >500 Hr | >500 Hr | >500 Hr |

TABLE 3

|  |  |  | Comparative Example 1 | Comparative Example 2 | Comparative Examples | Comparative Example 4 | Comparative Example 5 |
|---|---|---|---|---|---|---|---|
| Composition (unit: g) | Organopolysiloxane | Synthesis Example 1 |  |  | 10 |  |  |
|  |  | Synthesis Example 2 |  |  |  |  |  |
|  |  | Synthesis Example 3 |  |  |  |  |  |
|  |  | Synthesis Example 4 |  |  |  |  |  |
|  |  | Synthesis Example 5 |  |  |  |  |  |
|  |  | Synthesis Example 6 |  |  |  | 10 | 10 |
|  | Component (D) | CELLOXIDE 2021 P | 10.0 |  |  |  |  |
|  |  | EPOLITE 4000 |  | 10.0 |  |  |  |
|  | Component (B) | DPDM | 1.00 | 1.00 |  | 0.70 | 1.00 |
|  | Leveling agent | BYK300 | 0.055 | 0.055 | 0.035 | 0.039 | 0.055 |
|  | Component (E) | ALCH | 0.55 | 0.55 | 0.35 | 0.39 | 0.55 |
|  | Solvent | PMA | 17.4 | 17.4 | 8.0 | 9.1 | 14.4 |
|  | NV (nonvolatile content) |  | 40% | 40% | 40% | 40% | 40% |
| Evaluation | Pot life |  | C | A | A | D | D |
|  | initial gloss |  | 92 | 91 | 90 | — | — |
|  | Gloss of scratch test portion |  | 52 | 22 | 21 | — | — |
|  | Gloss retention ratio |  | 57% | 24% | 23% | — | — |
|  | Scratch resistance |  | D | D | D | — | — |
|  | Hot water resistance |  | C | C | C | — | — |
|  | Chemical resistance |  | D | D | D | — | — |
|  | Adhesion |  | A | A | C | — | — |
|  | Resistance to cracking under moisture and heat |  | >500 Hr | >500 Hr | >500 Hr | — | — |

The results shown in Tables 2 and 3 reveal the following. In all of Examples 1 to 12, diphenyldimethoxysilane, diphenylsilanediol, or triphenylsilanol as a hydrolysate, which is the component (B), was blended with the organopolysiloxane (A) having a glycadyloxy group, the blended product exhibited a sufficient pot life after being blended with the organoaluminum compound (E) as a curing agent, and the cured coating film formed had good scratch resistance, hot water resistance, chemical resistance, adhesion to abase material, and resistance to cracking under moisture and heat.

On the other hand, in Comparative Examples 1 and 2, an organic compound having an epoxy group was used instead of the organopolysiloxane (A) having a glycidyloxy group, and the cured coating film formed had insufficient scratch resistance, hot water resistance and chemical resistance.

In Comparative Example 3, the component (B) was not blended, and the cured coating film had insufficient scratch resistance, hot water resistance, chemical resistance and adhesion to the base material.

In Comparative Examples 4 and 5, an organopolysiloxane having no glycidyloxy group and having an epoxy cyclohexyl group is blended instead of the organopolysiloxane (A) having a glycidyloxy group, and both laminates had an extremely short pot life and were unsuitable for practical use.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. A resin composition comprising:
   (A) an organopolysiloxane having a glycidyloxy group; and
   (B) at least one selected from the group consisting of a triarylalkoxysilane, a diaryldialkoxysilane, a hydrolysate thereof and a partially hydrolyzed/condensed product thereof,
   wherein a content of the at least one selected from the group consisting of the triarylalkoxysilane, the diaryldialkoxysilane, the hydrolysate thereof and the partially hydrolyzed/condensed product thereof (B) is 2 parts by weight or more and 20 parts by weight or less based on 100 parts by weight of a total of an epoxy group-containing component containing the organopolysiloxane (A).

2. The resin composition according to claim 1, wherein the triarylalkoxysilane is a triphenylalkoxysilane and the diaryldialkoxysilane is a diphenyldialkoxysilane.

3. The resin composition according to claim 1, wherein the at least one selected from the group consisting of a triarylalkoxysilane, a diaryldialkoxysilane, a hydrolysate thereof and the partially hydrolyzed/condensed product thereof (B) is at least one selected from the group consisting of triphenylmethoxysilane, triphenylsilanol, diphenyldimethoxysilane and diphenyldisilanol.

4. The resin composition according to claim 1, further comprising (C) a β-dicarbonyl compound, wherein a content of the β-dicarbonyl compound (C) is 0.5 parts by weight or more and 50 parts by weight or less based on 100 parts by weight of the organopolysiloxane (A).

5. The resin composition according to claim 1, further comprising (D) an organic compound having one or more of an epoxy group, an oxetanyl group, and a vinyl ether group, wherein a content of the organic compound (D) is 1 part by weight or more and 200 parts by weight or less based on 100 parts by weight of the organopolysiloxane (A).

6. The resin composition according to claim 5, wherein the organic compound (D) has a molecular weight of 200 or more and 2,000 or less.

7. The resin composition according to claim 1, wherein the organopolysiloxane (A) further has an epoxy cyclohexyl group.

8. The resin composition according to claim 1, wherein the organopolysiloxane (A) satisfies a requirement that $[T3/(Q1+Q2+Q3+Q4+T1+T2+T3+D1+D2+M1)] \times 100$ is 75% or more and 100% or less,
   wherein, among constituent units forming the organopolysiloxane (A):
   the constituent units derived from a tetraalkoxysilane, that form one, two, three and four siloxane bonds, are defined as Q1, Q2, Q3 and Q4, respectively;
   the constituent units derived from a monoorganotrialkoxysilane, that form one, two and three siloxane bonds, are defined as T1, T2 and T3, respectively;
   the constituent units derived from a diorganodialkoxysilane, that form one and two siloxane bonds, are defined as D1 and D2, respectively; and
   the constituent unit derived from a triorganomonoalkoxysilane, that forms one siloxane bond, is defined as M1.

9. The resin composition according to claim 1, further comprising a neutral salt, wherein a content of the neutral salt is 0.001 parts by weight or more and 1 part by weight or less based on 100 parts by weight of the organopolysiloxane (A).

10. A method for producing a resin composition, the method comprising:
    subjecting an alkoxysilane component containing an alkoxysilane compound having a glycidyloxy group-containing organic group to a hydrolysis and dehydration condensation reaction in presence of a neutral salt and water to obtain organopolysiloxane (A) having a glycidyloxy group; and
    mixing the organopolysiloxane (A) with at least one selected from the group consisting of a triarylalkoxysilane, a diaryldialkoxysilane, a hydrolysate thereof and a partially hydrolyzed/condensed product thereof (B);
    wherein a content of the at least one selected from the group consisting of a triarylalkoxysilane, a diaryldialkoxysilane, a hydrolysate thereof and the partially hydrolyzed/condensed product thereof (B) is 2 parts by weight or more and 20 parts by weight or less based on 100 parts by weight of a total of an epoxy group-containing component containing the organopolysiloxane (A), and a content of the neutral salt is 0.001 parts by weight or more and 1 part by weight or less based on 100 parts by weight of the organopolysiloxane (A).

11. The method according to claim 10, further comprising mixing the organopolysiloxane (A) with a β-dicarbonyl compound (C), wherein a content of the β-dicarbonyl compound (C) is 0.5 parts by weight or more and 50 parts by weight or less based on 100 parts by weight of the organopolysiloxane (A).

12. The method according to claim 10, further comprising mixing the organopolysiloxane (A) with an organic compound (D) having one or more of an epoxy group, an oxetanyl group and a vinyl ether group and having a molecular weight of 200 or more and 2,000 or less, wherein a content of the organic compound (D) is 1 part by weight or more and 200 parts by weight or less based on 100 parts by weight of the organopolysiloxane (A).

13. A multi-liquid curable resin composition comprising:
a first liquid; and
a second liquid;
wherein:
the first liquid is the resin composition according to claim 1, and
the second liquid contains (E) an organoaluminum compound and/or organotitanium compound, wherein an amount of the organoaluminum compound and/or organotitanium compound (E) is 0.5 parts by weight or more and 10 parts by weight or less based on 100 parts by weight of the organopolysiloxane (A).

14. A cured product obtained by mixing the resin composition according to claim 1 with (E) an organoaluminum compound and/or organotitanium compound to form a mixture, and curing the mixture, wherein an amount of the organoaluminum compound and/or organotitanium compound (E) is 0.5 parts by weight or more and 10 parts by weight or less based on 100 parts by weight of the organopolysiloxane (A).

15. A method for producing a laminate including a base material and a cured coating film, the method comprising:
mixing the resin composition according to claim 1 with (E) an organoaluminum compound and/or organotitanium compound to obtain a mixture; and
applying the mixture to the base material, and curing the mixture by heating to form the cured coating film,
wherein an amount of the organoaluminum compound and/or organotitanium compound (E) is 0.5 parts by weight or more and 10 parts by weight or less based on 100 parts by weight of the organopolysiloxane (A).

* * * * *